US008825708B1

(12) United States Patent
Sunday (10) Patent No.: US 8,825,708 B1
(45) Date of Patent: Sep. 2, 2014

(54) PROGRAM LANGUAGE BINDING GENERATION FOR SYSTEM INTERFACES

(75) Inventor: Joseph Sunday, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 1349 days.

(21) Appl. No.: 12/113,179

(22) Filed: Apr. 30, 2008

(51) Int. Cl.
G06F 7/00 (2006.01)
G06F 17/30 (2006.01)

(52) U.S. Cl.
USPC .......................................................... 707/796

(58) Field of Classification Search
CPC ................................................ G06F 17/30292
USPC .......................................................... 707/796
See application file for complete search history.

(56) References Cited

U.S. PATENT DOCUMENTS

| | | | | |
|---|---|---|---|---|
| 5,499,371 A * | 3/1996 | Henninger et al. | ........... | 717/108 |
| 5,848,273 A * | 12/1998 | Fontana et al. | ................ | 717/108 |
| 5,911,076 A * | 6/1999 | Acker et al. | .................... | 717/147 |
| 6,038,565 A * | 3/2000 | Nock | .................................... | 1/1 |
| 6,694,321 B1 * | 2/2004 | Berno | .................................. | 1/1 |
| 7,152,229 B2 * | 12/2006 | Chong et al. | .................. | 717/146 |
| 7,293,253 B1 * | 11/2007 | Soukup | ......................... | 717/108 |
| 7,370,318 B1 * | 5/2008 | Howe et al. | ................... | 717/110 |
| 7,681,203 B2 * | 3/2010 | Mandato et al. | .............. | 719/316 |
| 7,823,169 B1 * | 10/2010 | Wheeler | ........................ | 719/330 |
| 2003/0005169 A1 * | 1/2003 | Perks et al. | .................... | 709/315 |
| 2003/0078902 A1 * | 4/2003 | Leong et al. | .................... | 706/59 |
| 2003/0105883 A1 * | 6/2003 | Gibbons | ....................... | 709/313 |
| 2004/0036719 A1 * | 2/2004 | Van Treeck | .................... | 345/763 |
| 2006/0129605 A1 * | 6/2006 | Doshi | ........................ | 707/104.1 |
| 2006/0248519 A1 * | 11/2006 | Jaeger et al. | ................... | 717/141 |
| 2007/0156752 A1 * | 7/2007 | Becker et al. | ............. | 707/103 X |
| 2008/0022267 A1 * | 1/2008 | Johnson et al. | ............... | 717/143 |
| 2008/0126486 A1 * | 5/2008 | Heist et al. | ..................... | 709/205 |
| 2008/0134156 A1 * | 6/2008 | Osminer et al. | ............. | 717/140 |
| 2008/0222616 A1 * | 9/2008 | Cheng et al. | .................. | 717/137 |
| 2010/0138778 A1 * | 6/2010 | Dewan et al. | ................. | 715/789 |

* cited by examiner

*Primary Examiner* — Rehana Perveen
*Assistant Examiner* — Mark E Hershley
(74) *Attorney, Agent, or Firm* — Perkins Coie LLP (57) ABSTRACT

A solution is introduced to generate structured program language bindings for system interfaces in various kinds of programming languages, which provides a higher level semantic view for system integration. The primary goal of the language bindings is to present a view of the system interfaces as Java objects rather than message building primitives. Consequently, a system developer or integration programmer can focus on functions of the interfaces required for the integration and no longer have to deal with the construction and processing of messages of the interfaces.

22 Claims, 6 Drawing Sheets

```
/**************************
* @apifile-read-symlink
* @desc Read the contents of a symlink.
* @namespace filer
* @status supported
* @test admin/zapi-file.thp1
*
* @input path
* @type string
* @desc Path of the symlink file to read.
* The value is expected to begin with /vol/<volumename>.
*
* @output symlink
* @type string
* @desc Value of the symlink. In other words, this is the
* destination path contained in the symlink.
********************/
```

Fig. 3(a)

```
* Read the contents of a symlink.
*/
@Api("file-read-symlink")
@Status(StatusEnum.PUBLIC)
public class FileReadSymlink implements Serializable {
        private static final long serialVersionUID = 1L;
        private String path;
        private String symlink;
        public FileReadSymlink (){}
        /**
        * Path of the symlink file to read.
        * The value is expected to begin with /vol<volumename>.
        */
        @Input("path")
        @Type ("string" )
        public void setPath(String path) {this.path = path;} public String getpath0 {return this.path;}
        /**
        * Value of the symlink. In other words, this is the
        * destination path contained in the symlink.
        */
        @Output("symlink")
        @Type("string")
        public void setSymlink(String symlink) {this.symlink = symlink;}
        public String getSymlink() {return this.symlink;}
}
```

PROGRAM LANGUAGE BINDING GENERATION FOR SYSTEM INTERFACES

FIELD OF THE INVENTION

At least one embodiment of the present invention pertains to system interfaces, and more particularly, to a technique for interfaces to storage systems.

BACKGROUND

Complex systems utilize various interfaces for system control and management, where each interface may provide a different method of interfacing with the system. Among such complex systems is a storage server, which is a special purpose processing system used to store and retrieve data on behalf of one or more client processing systems ("clients") over a network. A conventional storage server includes a storage operating system that implements a file system to logically organize data as a hierarchical structure of directories and files on the disks. A file system is any organization of data in a structured manner, which can be, but is not necessarily, organized in terms of a structured (e.g., hierarchical) set of stored files, directories and/or other types of data containers.

A file server is an example of a storage server that may be accessed using various interfaces. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). In conventional storage systems, the physical storage devices may be organized into one or more groups of disks (e.g., redundant array of inexpensive disks (RAID)). These disks, in turn, define an overall logical arrangement of storage space, including one or more storage volumes. A storage volume is any logical data set that is an abstraction of physical storage, combining one or more physical storage devices (e.g., disks) or parts thereof, into a logical storage object, and which is managed as a single administrative unit, such as a single file system. A volume may be defined from a larger group of available storage, such as an aggregate. The physical storage device(s) underlying a storage volume may vary in different implementations. In some instances, a storage volume as described herein can be a flexible storage volume, i.e. a volume that is flexibly associated with the underlying physical storage device(s). In other instances, a storage volume as described herein can be a traditional volume, i.e., a volume that is mapped directly and inflexibly to the underlying physical storage device(s).

Another example of a storage server is a device that provides clients with block-level access to stored data, rather than file-level access, or a device that provides clients with both file-level access and block-level access. Data stored by a storage server may be stored in the form of multiple blocks that each contains data. A block is the basic unit used by a file system in a storage server to manipulate and transfer data and/or metadata. A client may use any of various interfaces to access the file server.

A storage server can be used for many different purposes, such as to provide multiple users with access to shared data or to backup mission critical data. The storage system may utilize a set of system interfaces to support various commands and operations to serve its purposes. Both a command line interface and an application programming interface (API) may be utilized to control or manage the storage server, where the command line interface is an interactive process with a user, while the API is generally a non-interactive interface. For a non-limiting example, an API may take one or more required or optional arguments, values, or parameters for its basic functions, wherein the arguments can be passed to or from the interface as inputs or outputs. In one example, an API may provide for marshalling of API name and input parameters using XML (extensible markup language), with input parameters being typed and the contents of the XML being independent of the programming language and architecture on both client and server sides of a transaction, and with the server returning values from the invocation of the API marshaled in the same format as the input.

Program language binding enables an integration developer to obtain a semantic view of the API and to able to focus on using the API method and not on dealing with the underlying message construction and parsing. Providing a language binding that supports upward compatibility of an interface is critical since upgrading to utilize the language binding library for a newer version of the interface must not require any updates to the client side application. A design to map the methods of the interface directly to Java methods does not meet this requirement as the addition of new optional arguments or outputs to an interface's method results in method signature changes, therefore impacting existing client application code. Furthermore, existing interface methods in some cases have large numbers of optional input parameters, making API usage difficult to manage (i.e. which argument goes in which position in the call).

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

The approach is illustrated by way of example and not by way of limitation in the figures of the accompanying drawings in which like references indicate similar elements. It should be noted that references in this specification to "an embodiment", "one embodiment", or the like, mean that the particular feature, structure or characteristic being described is included in at least one embodiment of the present invention. Occurrences of such phrases in this specification do not necessarily all refer to the same embodiment.

For IT companies to deploy products or services to its customers, it is often difficult to do so in a limited time frame, especially when the environment existing at the customer side is complex. For example, the client may have hundreds of servers located geographically around the globe, where the severs may operate under different platforms that may need to be modified for the integration of a new product or service in order to prevent a disruption to the complex environment and to maintain business continuity. Thus, it is important to have a simple method for deploying or modifying a software product or service.

A solution is introduced to generate structured program language bindings for system interfaces in various kinds of programming languages, which provides a higher level semantic view for system integration. The primary goal of the language bindings is to present a view of the system interfaces as Java class objects rather than message building primitives. Consequently, a system developer or integration programmer can focus on functions of the interfaces required for the integration and no longer have to deal with the construction and processing of messages of the interfaces in order to prevent prolonged system downtime.

Such a native programming language binding solution at the semantic level of a message-based API provides significant value to the client side developer and integrator. The advantages for developer productivity and solution robustness include but are not limited to, upward compatibility, less code to write, the integration programmer does not have to work through the process of building XML message code, and code is no longer required in the client application. Additionally, the integration programmer no longer needs to understand the message syntax itself, thus removing the need to write lots of test programs just to figure out how to access the data structures from the integration process.

Figure 1:
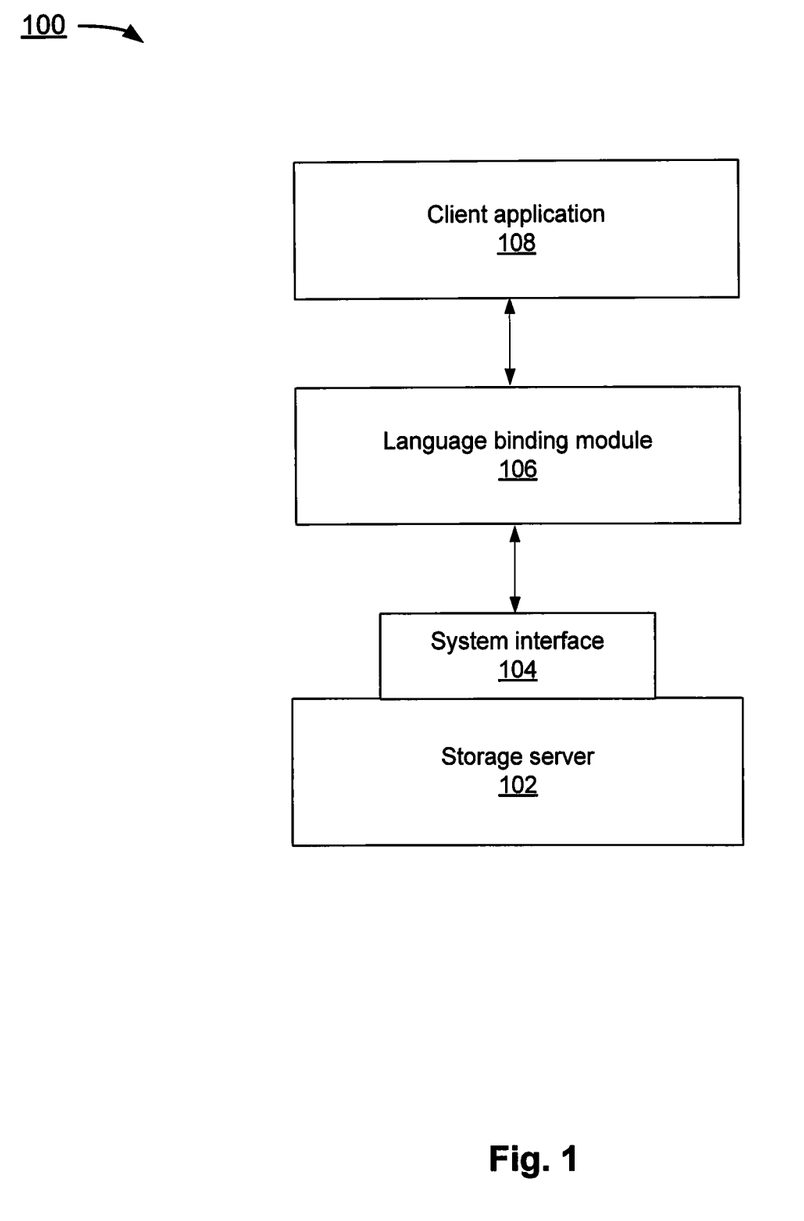
FIG. 1 illustrates an example of a system for providing programming language binding at semantic level.

FIG. 1 illustrates an example of a system 100 for providing programming language binding at semantic level. Although the diagrams depict components as functionally separate, such depiction is merely for illustrative purposes. It will be apparent to those skilled in the art that the components portrayed in this figure can be arbitrarily combined or divided into separate components.

In the example of FIG. 1, the configuration 100 includes a storage server 102, which includes a logical aggregation of physical data storage (not shown), a system (storage) interface 104 associated with the storage server 102, a language binding module 106 that provides the system interface 104 to a client application 108 at semantic level.

In the example of FIG. 1, the storage server 102, the system interface 104, the language binding module 106, and the client application 108 run on a host (not shown). Such host can be a computing device, a communication device, a storage device, or any electronic device capable of running a software, wherein the host contains at least a processor, a volatile storage (memory), and a non-volatile storage (not shown). For non-limiting examples, a host can be but is not limited to, a laptop PC, a desktop PC, a tablet PC, an iPod, a PDA, or a server machine. A storage device can be but is not limited to a hard disk drive, a solid state device such as a flash memory drive, or any portable storage device. A communication device can be but is not limited to a mobile phone.

In the example of FIG. 1, the storage server 102, the system interface 104, the language binding module 106, and the client application 108 may optionally communicate with each other over a network (not shown). Here, the network can be but is not limited to, a local area network (LAN), wide area network (WAN), metropolitan area network (MAN), global area network such as the Internet, a Fibre Channel fabric, or any combination of such interconnects.

In the example of FIG. 1, the system interface 104 associated with the storage server 102 in FIG. 1 provides functions related to the management and operation of the server 102. As a storage interface, it provides access to functionality relevant to managing disk subsystems, adapters, and cluster interfaces of the storage server 102. The interface 104 can be based on structured XML request to allow custom integration to storage systems (and other software). The interface 104 may use XML internally to represent both the inputs and outputs of an API invocation.

In the example of FIG. 1, the language binding module 106 depicted in FIG. 1 is designed to support the concept of upward compatibility by modeling each method in the interface 104 as a Java class such that the client application 108 built against one version of the program language bindings will work, unchanged, against a new version of the language bindings. For a non-limiting example, the language binding module 106 can support generic system programming interface and also be used to generate bindings for storage system-specific APIs. The inputs and outputs of the interface 104 are property attributes of the class and are accessed with getter and setter methods. Method signatures are not "crowded" by large numbers of optional inputs the client is not concerned with. Since interface methods are only extended by adding new optional inputs and outputs, the same mechanism prevents fragile method signatures from breaking existing code when upgrading to a newer version of the interface 104. The only impact in the generated bindings is to create additional getter and setter methods. The signatures of any methods used in older code are left untouched, preserving both source and binary compatibility. In addition, composite classes can be built from standard Java primitives in order to map complex interface input and output structures. A client application simply constructs Java objects and uses familiar getter, setter and iteration methods to navigate the interface structures.

While the system 100 depicted in FIG. 1 is in operation, the client application (program) 108 may identify methods in the interface 104 to call for the management and operation of the storage server 102 for the purpose of, as a non-limiting example, integrating a newly deployed software or service into the client application. The language binding module 106 models each interface method identified by the client application 108 as a Java class in such a way that upward compatibility is achieved. The code of the client application 108 then issues a request to manage or operate the storage server 102 via the generated classes of methods of the interface 104, and may set parameters to the request using generated Java classes of the methods. A small core of runtime classes generated by language binding module 106 use the reflection and annotation (metadata) features of the Java language to utilize metadata within the generated classes to marshall and un-marshall the correct XML messages in the proper XML structure of the interface 104. At the server end, the storage server 102 may extract the parameters from the request for processing and package up a response. Finally, the data can be extracted by the client application 108 from the response using generated Java classes of the methods.

Figure 2:
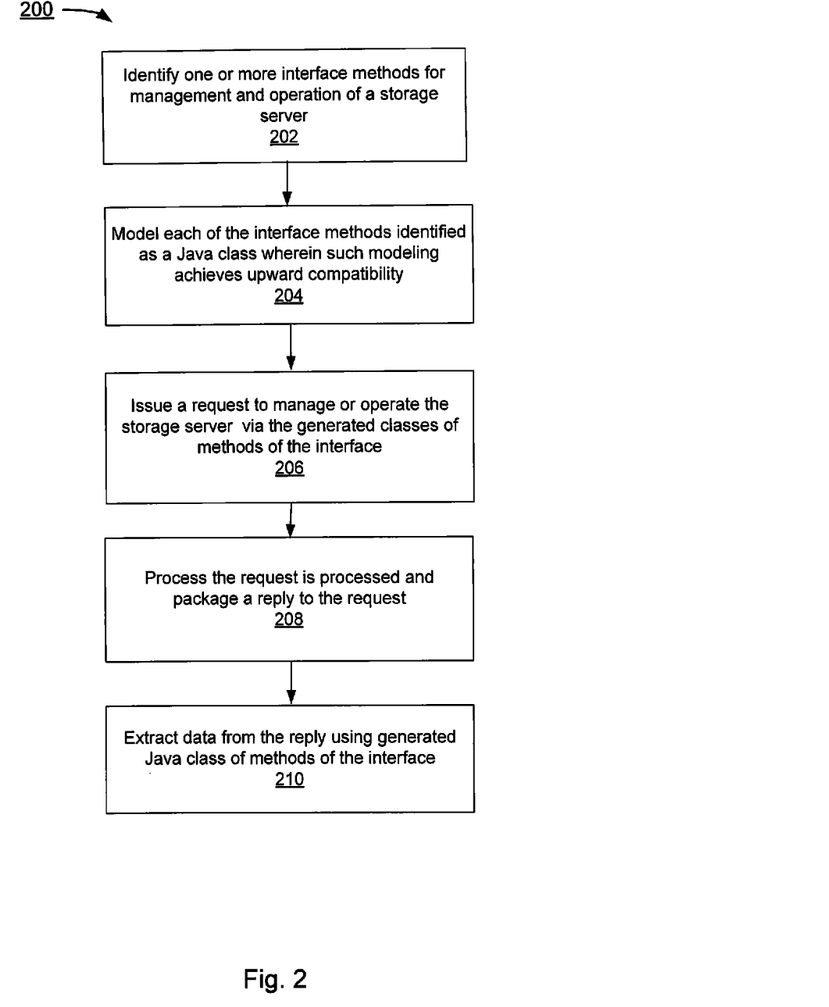
FIG. 2 depicts a flowchart of an example of a process for providing programming language binding at semantic level.

FIG. 2 depicts a flowchart 200 of an example of a process for providing programming language binding at semantic level. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

The flowchart 200 starts to block 202 where one or more interface methods for management and operation of a storage server are identified. The flowchart 200 continues to block 204 where each of the interface methods identified is modeled as a Java class wherein such modeling achieves upward compatibility. The flowchart 200 continues to block 206 where a request to manage or operate the storage server is issued via the generated classes of methods of the interface. The flowchart 200 continues to block 208 where the request is processed and a response to the request is provided (e.g., packaged). The flowchart 200 ends at block 210 where data is extracted from the response using generated Java class of methods of the interface.

The system and process described above provides a turn-key method for generating such a language binding for the Java programming language and it can be adapted for C# based on their language similarities. Other programming languages can additionally be supported with the additional inspection methods to be added to the generated code to support the needs of the runtime elements. The issue of parsing and building a representation of the defined system interface is the same for any client language binding and a technique can be designed to enable the interface code generation to be handled by language specific plug-ins to emit code in the proper language style such as Java or C#. The implementation of the runtime classes in C# can be done based on the similarities of Java and C# as programming languages and the common language features that the interface method depends upon (such as reflection and annotations). The differences in the generated code mostly relate to the syntactic differences of Java and C#. The code generator is designed in a manner to require just the necessary code emitter plug-in to be developed is the basis for extension to other client side languages, such as Perl, C, or C++.

In some embodiments, the language binding module 106 depicted in FIG. 1 takes advantage of programming environments, such as open source integrated development environment (IDE) of Eclipse or NetBeans utilized by many Java application developers. More specifically, the language binding module 106 generates classes that include full documentation of the system interfaces as JavaDoc comments so an integration programmer can have documentation fully available through the IDE's JavaDoc lookup feature without having to reference a separate document format to understand the interface. Additional IDE features, such as code completion, enable the developer to more easily find the interface's methods and arguments of interest by providing the lookup capability for the generated Java objects of the interface. Also, the hierarchies of aggregated structures are also Java classes whose attributes can be found via the auto-complete mechanism. The application programmer is now able to program using all the productivity features provided by the IDE to aid in examining, understanding, and programming to the interface.

In some embodiments, the language binding module 106 depicted in FIG. 1 ensures the client application 108 is more reliable by elevating the usage of the interface 104 to the Java language semantics and verifying the correct usage of the classes of the interface 104 by the process of compiling the client application. Assuming the source used to generate the interfaces matches the implementation of the interfaces, it is not possible for a malformed message from the interface to be created by the integration programmer. Here, all XML marshalling is managed by the language binding module 106 via a validated and automated code generation process, which ensures the XML messaging matches the API specification. Errors in the assembly of XML messages due to misreading the API are discovered before the code is executed while validation of the XML message occurs not just when executed against the actual storage system without having all possible code paths that assemble interface's message need to be tested. Consequently, an integration programmer can be more productive in building an application which utilizes the interfaces.

In some embodiments, some runtime classes of the generated classes of the interface 104 actually perform the message transformation, the code of the Java class that maps to the interface 104 is strictly declarative. The full set of Java declarations that bind to the interface can be created via a code generation program, which automates the mapping process to create Java classes from the interface specifications. The resulting generated code is then available to be directly compiled and used as a library within the client application 108 and the complexities of dealing with an XML request response style API mechanism are not present in the client application 108. The application programmer integrating with the interface 104 does not need to create proper XML data trees with element names that properly match the interface method being used. Rather the programmer simply identifies the interface method to call, creates an object, and uses native get and set methods to deal with the inputs and outputs.

For a non-limiting example, the following Table 1 and 2 show program mappings between annotations and types of a definition of a system interface structure to Java language construct, respectively. At the lowest level, the structures defined by the interface are simply groups of primitives, such as strings and integers, which are mapped to corresponding Java types.

TABLE 1

Interface annotations to Java mapping

| Interface annotation | Java construct |
|---|---|
| @ category, @ namespace | Package |
| @ api, @ typedef | Class |
| @ desc | Javadoc Comment |
| @ input, @ output | Property Attribute |
| @ type | Java Type |
| @ errno | Enumeration Value |

TABLE 2

Interface types to Java mapping

| Interface element type | Java construct |
|---|---|
| String | Java.lang.String |
| Boolean | Java.lang.boolean |
| Integer | Based on @ Range |
| | Java.lang.Integer |
| | Java.lang.Long |
| | Java.math.BigInteger |
| Field ending with * _time or * _timestamp | Java.util.Date |
| [ ] | Generic Collections |

Figure 3A:
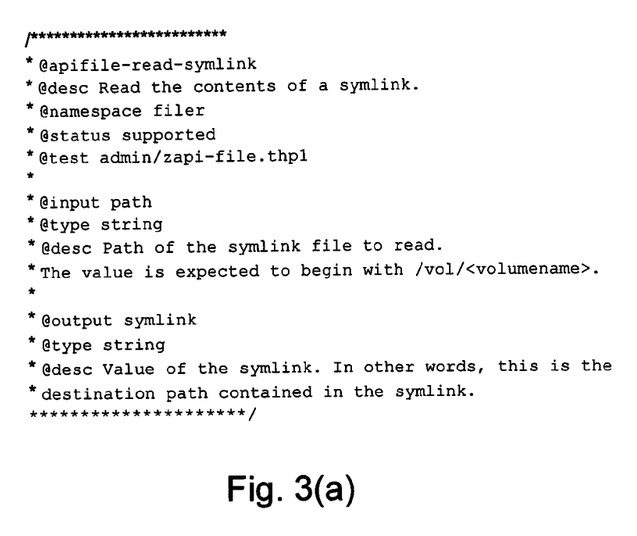
FIGS. 3(a)-(b) depict a definition of an example of an API, and the Java class generated from the API, respectively.
Figure 3B:
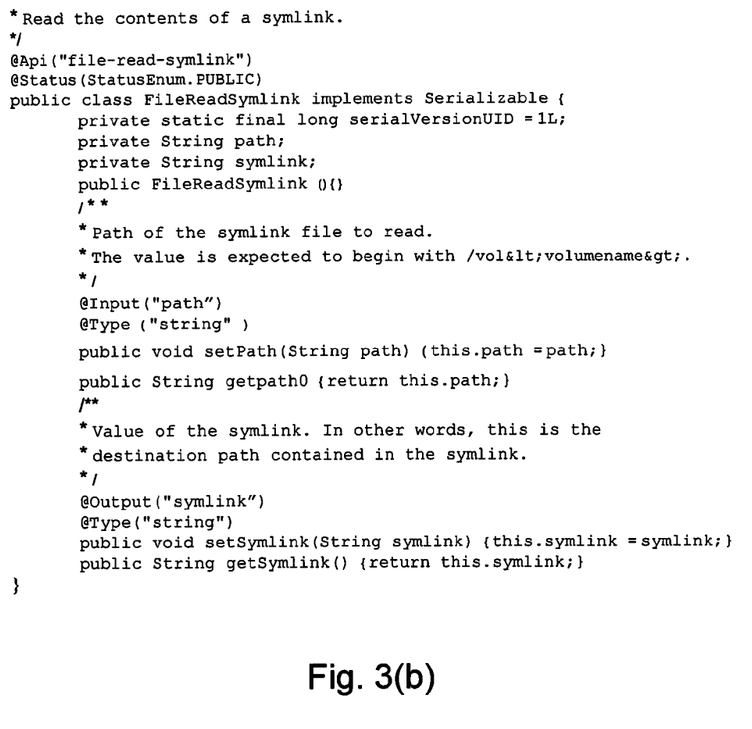

For a non-limiting example, FIG. 3(a) depicts a definition of the file-read-symlink API, and FIG. 3(b) depicts the Java class generated from the file-read-symlink API by the system 100 in FIG. 1. Note that the language binding approach depends on the rules related to the format and structure of interface definition to be enforced so that appropriate parsing can be performed. For such binding to be valid, interface definition conventions must be validated and maintained to be in accordance with the interface specifications.

In some embodiments, additional capabilities can be provided the language binding module 106 depicted in FIG. 1 with some improvements to the metadata annotation for the interface 104. The extension of the metadata information within an interface definition allows the code generation to support additional client side features.

In some embodiments, the use of a first class enumeration type (i.e. @enum) will allow the interface generation to construct true enumeration types in the client language binding rather than utilizing string parameters that actually are restricted to an enumerated set of allowable strings occasionally documented in @desc. Formal enumerations will increase the type-safety of the client side application given that the interface implementation ensures the allowed and returnable values are properly defined in the interface description.

In some embodiments, the interface definitions can be enhanced to include information as to when a particular method or attribute was introduced In order to more easily generate client bindings that match a specific interface release. This could allow language bindings to be generated for specific interface versions from a single interface definition rather than having to deal with definitions from differing baseline branches.

In some embodiments, the usage of a number of interface methods may have been superseded by more preferred usages and thus need to be altered in a manner that breaks any previous usages of a particular API. If these methods and attributes were noted in the interface definition in some manner (i.e. @legacy), then the client language bindings can additionally incorporate this information. In the case of Java, the use of deprecated classes and methods in the generated classes can allow client application programmers to learn that they are not using the preferred interface methods and allow them to adjust their integration.

In some embodiments, the iteration method naming convention within the interface 104 can to be enforced or an additional interface definition tag can be created to ensure that iteration methods were identifiable by the language binding process. For the case where a client application intends to select all of the elements from an interface iteration, methods can be generated that encapsulate the iteration looping reduce the programming needed.

In some embodiments, while the interface specific portion of the language binding is generated by the language binding module 106 depicted in FIG. 1, a small core of additional classes is needed to provide the complete client capabilities. These components implement the XML message level of the interface, supported by the annotation data in the generated classes. Such components include but are not limited to the following:

- Runner class, which uses the annotations present on generated Java binding classes to automatically construct an interface XML request and process an interface XML response back into the generated Java objects. The runner's only concern is the marshalling and un-marshalling activity through the interface.
- Executor class, which is a thin wrapper around a server class of interface responsible for sending the request to and receiving the response from a designated server address. The class abstracts away credential management by supporting multiple methods of invoking to an endpoint. Credentials for a destination are obtained via configuration files or from the calling client application. The executor class is thread-safe for multiple concurrent interactions within a client application.
- Executor factory, which is responsible for creating the runner and the executor class objects based on application configuration, which makes it possible to switch between direct execution or API-proxy destination access methods through operation manager with no application code change. It also optimizes network overhead by providing caching of frequently used executors to eliminate network and secure socket layer (SSL) handshake costs.

In some embodiments, the language bindings discussed above allowed for a more straight forward use of the interface 104 and can be utilized to interact with an operating system where project code was built and tested directly against a storage system and then later transitioned to utilize the API proxy mechanism of an operations management component. Because the interface runtime handles this redirection, no changes were necessary in the application code, even though the XML message structure required the additional API proxy layering.

Figure 4:
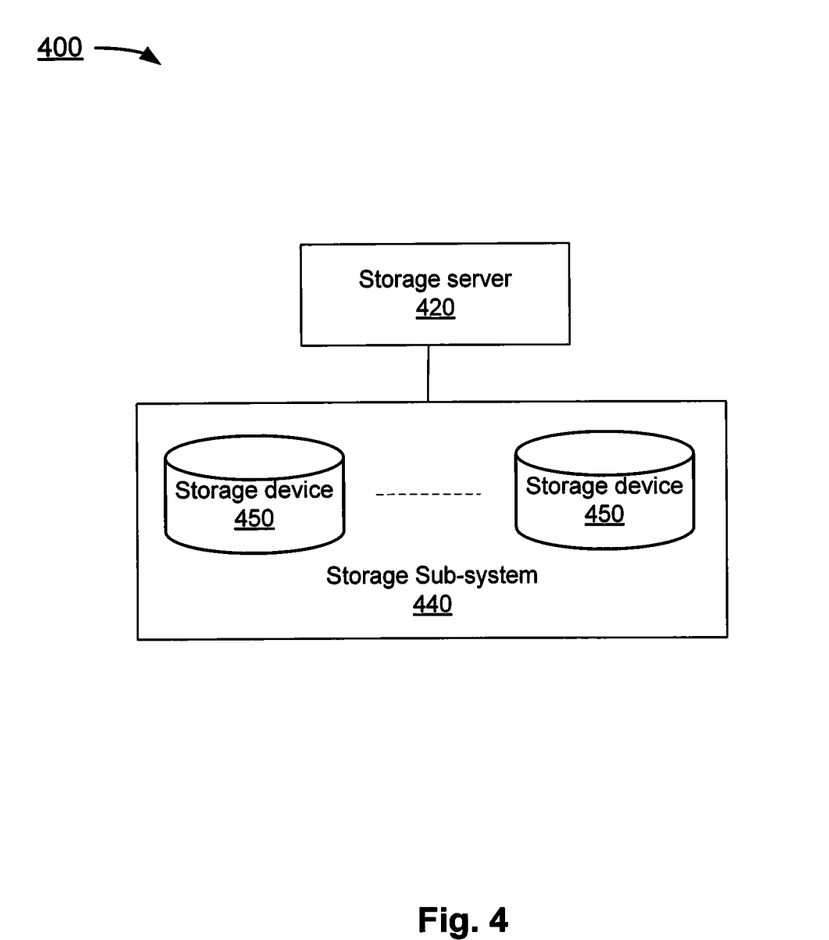
FIG. 4 shows a network environment in which the techniques introduced here the may be implemented.

FIG. 4 shows a network environment 400 in which the techniques introduced above may be implemented. The various embodiments described herein are not limited to any particular environment, and may be implemented in various storage processes. In the present illustration, the storage server 420 (102 in FIG. 1) is coupled with a mass storage subsystem 440, which includes a set of mass storage devices 450. The mass storage subsystem 440 is managed by the storage server 420. For a non-limiting example, the storage server 420 may receive and respond to various requests from the client application 108 invoking system interface 104 directed to data stored in or to be stored in the storage subsystem 440. The mass storage devices 550 in the mass storage subsystem 440 may be, for a non-limiting example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

In the example of FIG. 4, the storage server 420 may have a distributed architecture; for a non-limiting example, storage server 420 may include separate N-module (network module) and D-module (data module) components (not shown). In such an embodiment, the N-module is used to communicate with the client application 108 via system interface 104, while the D-module includes the file system functionality and is used to communicate with the storage subsystem 440. In another embodiment, the storage server 420 may have an integrated architecture, where the network and data components are all contained in a single box or unit. The storage server 420 further may be coupled through a switching fabric to other similar storage systems (not shown) that have their own local storage subsystems. In this way, all of the storage subsystems can form a single storage pool, to which any client of any of the storage systems has access.

Figure 5:
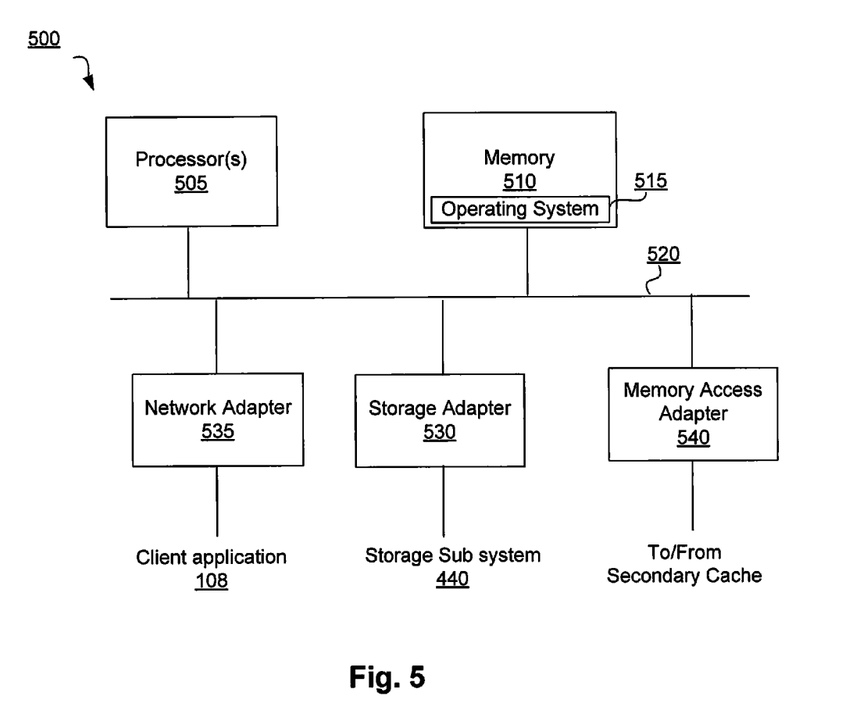
FIG. 5 is a high-level block diagram showing an example of the architecture of a storage server.

FIG. 5 is a high-level block diagram showing an example of the architecture of a storage server 500 (102 in FIG. 1). The storage server 500 includes one or more processors 505 and memory 510 coupled to a interconnect 520. The interconnect 520 shown in FIG. 5 is an abstraction that represents any one or more separate physical buses, point-to-point connections, or both connected by appropriate bridges, adapters, or controllers. The interconnect 520, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

In the example of FIG. 5, the processor(s) 505 may include central processing units (CPUs) of the storage server 500 and, thus, control the overall operation of the storage server 500. In certain embodiments, the processor(s) 505 accomplish this by executing software or firmware stored in memory 510. The processor(s) 505 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In the example of FIG. 5, the memory 510 is or includes the main memory of the storage server 500. The memory 510 represents any form of random access memory (RAM), read-only memory (ROM), flash memory, or the like, or a combination of such devices. In use, the memory 510 stores, among other things, the operating system 515 of the storage server 500.

In the example of FIG. 5, a storage adapter 530 and a network adapter 535 are also connected to the processor(s) 605 through the interconnect 620. The storage adapter 530 allows the storage server 600 to access a storage subsystem 440 and may be, for example, a Fibre Channel adapter or a SCSI adapter. The network adapter 635 provides the storage server 500 with the ability to communicate with remote devices, such as the client application 108, over a network and may be, for example, a Fibre Channel adapter or a SCSI adapter.

In the example of FIG. 5, the storage server 500 also includes a memory access adapter 540 coupled to the interconnect 520, to enable the processor(s) 505 to access the secondary cache (not shown). In some embodiments, the secondary cache is external to the storage server 500. In other embodiments, the secondary cache is physically attached to the main motherboard (not shown) of the storage server 500. In still other embodiments, the secondary cache is implemented on a separate substrate within the storage server 500 or on a substrate that attaches to a connector on the storage server 500.

Figure 6:
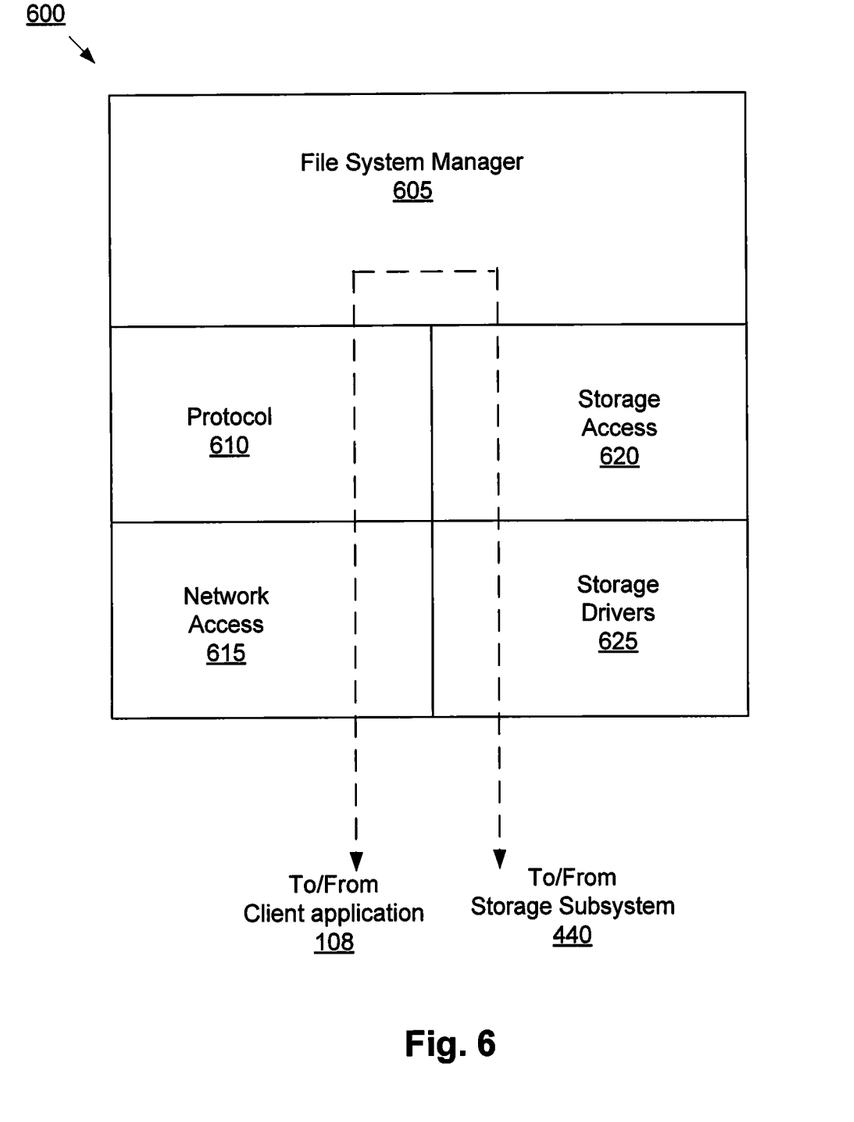
FIG. 6 illustrates an example of the operating system of the storage server.

FIG. 6 illustrates an example of the operating system 600 of the storage server 600. As shown, the operating system 600 includes several modules, or "layers." These layers include a file system manager 605. The file system manager 605 is software that keeps track of the directory structure (hierarchy) of the data stored in a storage subsystem and manages read/write operations on the data (i.e. executes read/write operations on the disks in response to client requests).

The operating system 600 also includes a protocol layer 610 and an associated network access layer 615, to allow a file server to communicate over a network to other systems, such as clients. The protocol layer 610 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 615 includes one or more drivers, which implement one or more lower-level protocols to communicate over the network, such as Ethernet. Interactions between clients and mass storage devices (e.g., disks) are illustrated schematically as a path, which illustrates the flow of data through the operating system 600.

The operating system 600 further includes a storage access layer 620 and an associated storage driver layer 625 to allow a file server to communicate with a storage subsystem. The storage access layer 620 implements a higher-level disk storage protocol, such as RAID, while the storage driver layer 625 implements a lower-level storage device access protocol, such as Fibre Channel Protocol (FCP) or SCSI. In one embodiment, the storage access layer 620 may implement a RAID protocol, such as RAID-4 or RAID-DP™ (RAID double parity for data protection provided by Network Appliance, Inc.), and therefore may alternatively be referred to as RAID layer 620.

Thus, a method and apparatus for providing programming language binding at semantic level has been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that stores information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system, comprising:
   a processor;
   a storage server configured to process a request for operation of the storage server and provide a response to the request;
   a system interface embodied in a computer readable storage device configured to manage operation of the storage server; and
   a language binding module that, when executed by the processor, generates a class of a first programming language for a method in the system interface, the generating including modeling the method in the system interface as the class of the first programming language, the method of the system interface being of a second programming language different from the first programming language, and wherein the storage server is further configured to
   receive, from a client application, the request for management or operation of the storage server via the class generated for the method in the system interface, and
   provide the response to the client application, the response including data that is configured to be extracted by the client application using the generated class.

2. A system as recited in claim 1, wherein:
   the system interface, the language binding module, and the client application each runs on a computing device, a communication device, a storage device, or any electronic device capable of running a software component.

3. A system as recited in claim 1, wherein:
   the storage server, the system interface, the language binding module, and the client application communicate with each other over a network.

4. A system as recited in claim 3, wherein:
   the network is one of: a local area network (LAN), wide area network (WAN), metropolitan area network (MAN), global area network such as the Internet, a Fibre Channel fabric, or any combination of such networks.

5. A system as recited in claim 1, wherein:
   the first programming language is Java or C#.

6. A system as recited in claim 1, wherein:
the class generated by the language binding module supports upward compatibility.

7. A system as recited in claim 1, wherein:
the class that is generated for the method of the system interface is declarative.

8. A system as recited in claim 1, wherein:
the language binding module generates a set of runtime classes to marshall and un-marshall XML messages through the interface.

9. A system as recited in claim 1, wherein:
the language binding module utilizes an integrated development environment (IDE).

10. A system as recited in claim 1, wherein:
the language binding module verifies usage of the method of the system interface based on semantics of the generated class.

11. A system as recited in claim 1, wherein:
the language binding module maps an annotation and/or type of definition of the interface to a programming language construct.

12. A system as recited in claim 1, wherein:
the client application sets and gets a parameter of the method via the generated class of the method.

13. A method, comprising:
identifying a method of an interface for management and operation of a storage server;
issuing a request to manage or operate the storage server via a class of a programming language generated for the identified interface method, wherein the generated class supports upward compatibility, wherein the class is generated by modeling the interface method as the class of the programming language, the interface method being of a first programming language different from the programming language of the class;
receiving a response to the request from the storage server; and
extracting data from the response using the class generated for the interface method.

14. A method as recited in claim 13, further comprising:
generating a set of runtime classes to marshall and un-marshall XML messages through the interface.

15. A method as recited in claim 13, further comprising:
utilizing an integrated development environment (IDE) for modeling the interface method.

16. A method as recited in claim 13, further comprising:
verifying usage of the interface method based on semantics of the generated class.

17. A method as recited in claim 13, further comprising:
mapping an annotation and/or type of definition of the interface to a programming language construct.

18. A method as recited in claim 13, further comprising:
setting and getting a parameter of the method via the generated class.

19. A storage server, comprising:
a processor configured to enable a client application to perform a storage management operation on a storage subsystem coupled to the storage server, wherein the storage subsystem includes a plurality of non-volatile mass storage devices;
a storage interface through which the storage server accesses the storage subsystem; and
a file system manager embodied in a machine readable device wherein, in operation:
accepts a request for one of the set of storage management operations from the client application via a class generated for a method of the storage interface, wherein the class is generated in a first programming language, wherein the class is generated by modeling the method of the storage interface as the class of the first programming language, the method of the storage interface being of a second programming language different from the first programming language,
performs the storage management operation on a storage location on the storage subsystem in response to the request from the client application, and
provides a response to the client application via the generated class.

20. A storage server as recited in claim 19, further comprising:
a network interface through which the client application communicates with the storage server over a network.

21. A storage server as recited in claim 19, wherein:
each of the plurality of mass storage devices in the storage subsystem is one of:
a magnetic disk, an optical disk such as a compact disk-read only memory (CD ROM) or a digital versatile/video disks (DVD)-based storage, a solid state device, a magneto-optical (MO) storage, a tape-based storage, or any other type of non-volatile storage device suitable for storing large quantities of data.

22. A system, comprising:
means for identifying a method of an interface for management and operation of a storage server;
means for generating a class of a programming language for the identified method of the interface, the generating including modeling the method of the interface as the class of the programming language, the method of the interface being of a first programming language different from the programming language, and wherein such modeling achieves upward compatibility;
means for issuing a request to manage or operate the storage server via the class of the interface method;
means for processing the request and providing a response to the request; and
means for extracting data from the response using the class of the interface method.

\* \* \* \* \*